No. 703,593. Patented July 1, 1902.
L. JONES, Jr.
GEARING.
(Application filed Apr. 12, 1902.)
(No Model.) 2 Sheets—Sheet 1.
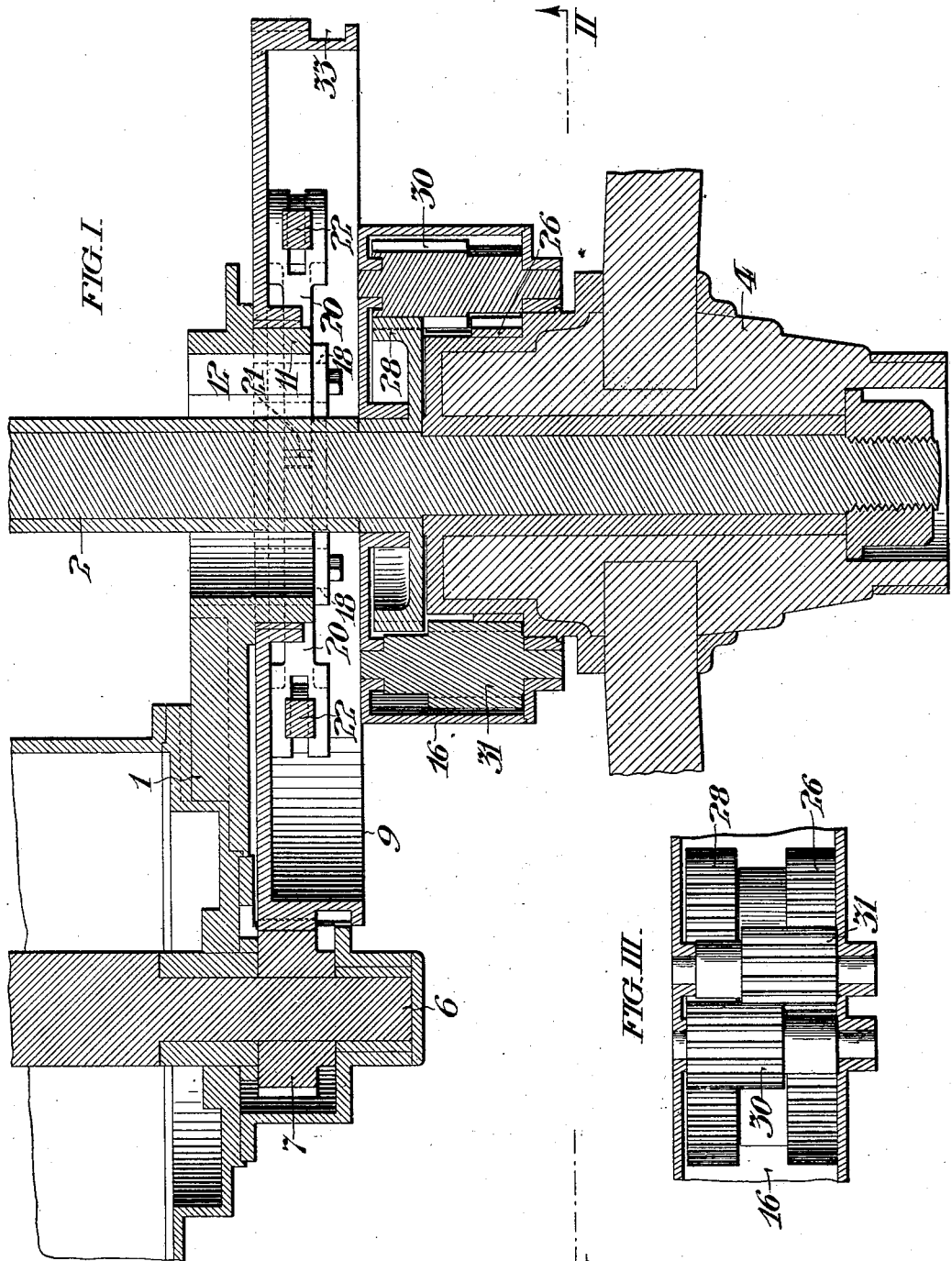
WITNESSES:
Clifton C. Hallowell
Edward Rittenhouse
INVENTOR:
LEWIS JONES, JR.
by Arthur E. Paige
Atty.

No. 703,593. Patented July 1, 1902.
L. JONES, JR.
GEARING.
(Application filed Apr. 12, 1902.)
(No Model.) 2 Sheets—Sheet 2.
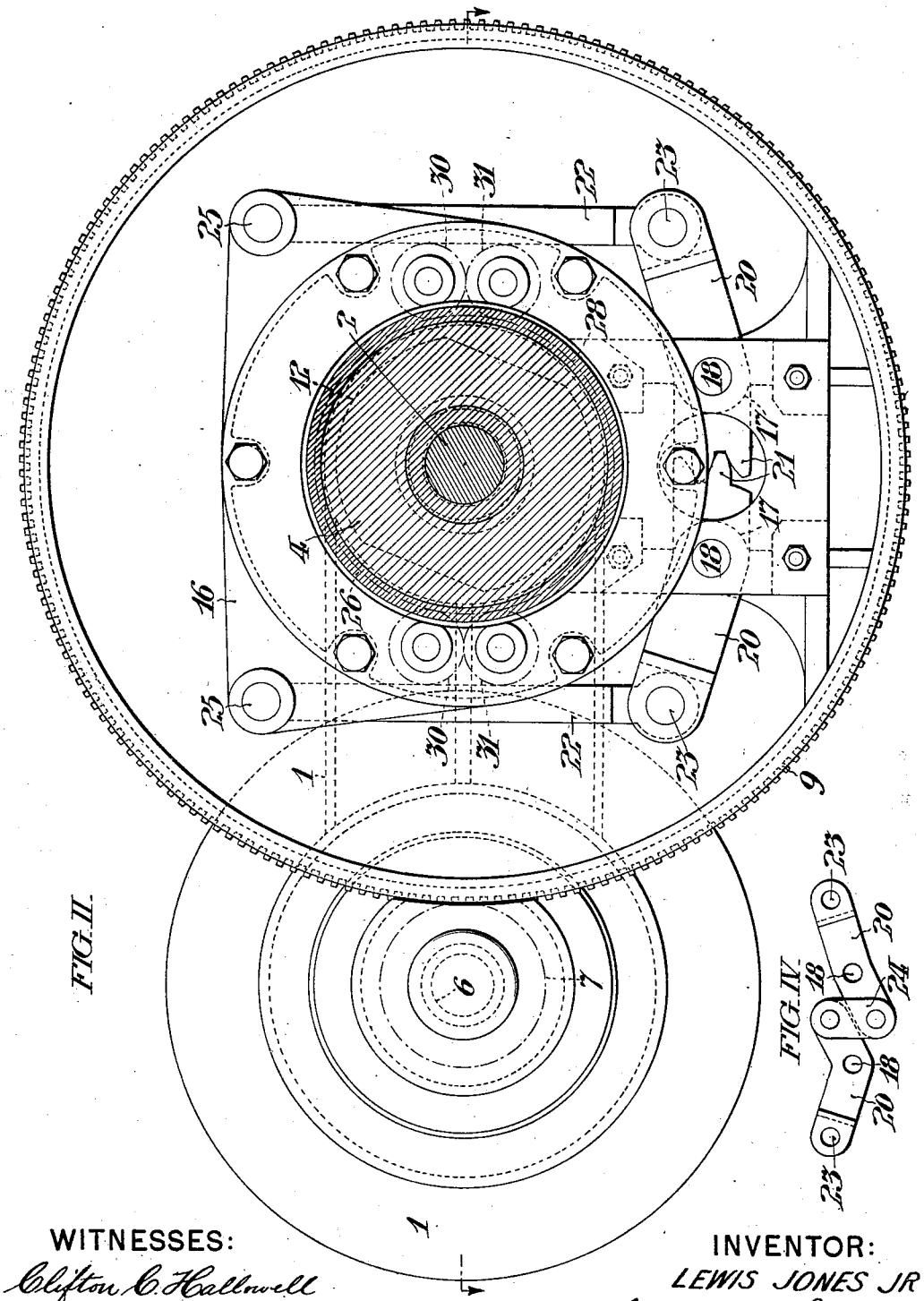
FIG. II.
FIG. IV.
WITNESSES:
Clifton C. Hallowell
Edward Rittenhouse
INVENTOR:
LEWIS JONES JR
by Arthur E. Paige
Atty.

UNITED STATES PATENT OFFICE.

LEWIS JONES, JR., OF PHILADELPHIA, PENNSYLVANIA.

GEARING.

SPECIFICATION forming part of Letters Patent No. 703,593, dated July 1, 1902.

Application filed April 12, 1902. Serial No. 102,556. (No model.)

*To all whom it may concern:*

Be it known that I, LEWIS JONES, Jr., of Philadelphia, in the State of Pennsylvania, have invented certain new and useful Improvements in Gearing, whereof the following is a specification, reference being had to the accompanying drawings.

My present invention relates to gearing of the type forming the subject-matter of my Letters Patent of the United States No. 691,634, dated January 21, 1902. Such gearing comprises a driving element and a driven element whose axes are normally parallel and concentric, but capable of relative gyration during the transmission of rotary motion from one to the other.

My improvements comprise a peculiar link-and-lever connection between said driving and driven elements by which rotary motion is transmitted; and my invention comprehends the various novel features of construction and arrangement hereinafter more definitely specified.

My improved gearing may be advantageously employed in a self-propelled vehicle to transmit rotary motion from the shaft of a motor mounted on the vehicle-body to the vehicle-supporting wheels, when said body and its wheels are connected by a resilient medium which permits of vertical movement of said body with respect to said wheels.

In the accompanying drawings, Figure I is a horizontal sectional view showing a convenient embodiment of my invention connecting a motor-shaft and supporting-wheel of a vehicle. Fig. II is a side elevation of the parts shown in Fig. I, the vehicle-wheel being sectioned on the line II II indicated in Fig. I. Fig. III is a fragmentary sectional view of the gear-casing, showing the relation of the planetary gears indicated in Figs. I and II. Fig. IV shows modified means for operatively engaging the levers.

In said figures, 1 is the frame of the motor, which is mounted upon a vehicle-body conveniently supported by springs connecting with the axle 2, provided with the vehicle-supporting wheels 4, only one of the latter being shown. The shaft 6 of the motor is provided with the pinion 7, engaged with the main driving-gear 9, and the latter is mounted to rotate upon the annular bearing 11, surrounding the opening 12 in the frame 1. Said opening 12 permits such relative gyration of the axes of the driving-gear 9 and the axle 2 as is occasioned by the operation of the vehicle-springs during the traverse of the vehicle. However, the driving element 9 is connected with the driven element 16, so as to transmit rotary motion thereto irrespective of the relative position of said gear 9 and said axle 2, as follows: Said gear 9 is provided with bearings 17 for the fulcrums 18 of a pair of levers 20, whose inner extremities are gear-sectors provided with intermeshing teeth 21. Said levers 20 are bifurcated at their outer extremities to receive the links 22 with which they are connected by the pivots 23, and the opposite extremities of said links 22 are connected to the driven element 16 by the pivots 25.

It is to be understood that the links and levers specified permit relative gyration of the members 9 and 16 without interference with the positive transmission of rotary motion from one to the other. Although I find it convenient to connect the levers 20 by the gear-teeth 21 it is to be understood that they may be operatively connected in any other convenient manner. For instance, as shown in Fig. IV, the inner extremities of said levers may be coupled by the pivoted yoke 24. Moreover, said levers and links would be equally operative if the levers were attached to the element 16 and the links were attached to the element 9. If it is desired to merely transmit rotary motion from the gear 9 to the axle 2, the driven element 16 may be rigidly secured to said axle. However, it being desired to so connect the vehicle-wheels 4 with the motor 1 as to permit relative compensating movement of said wheels when one of them is caused to traverse a circle of greater radius than the other, (by divergence of the vehicle from a straight line of traverse,) I constitute said driven element 16 a casing for other gear elements which operatively connect with the vehicle-supporting wheels 4, so that the latter may be rotated contemporaneously and independently, as follows: Said gear-casing 16 incloses the gears 26 and 28, which are respectively connected with the two vehicle-supporting wheels 4, mounted upon the opposite extremities of the axle 2, the gear 26 being carried by the wheel 4, which is mounted to rotate freely upon said axle 2, as shown in Fig. I, and the gear 28 being fixed to said axle 2, on which is fixed the other wheel 4. (Not shown.) Said gears 26 and 28 are operatively connected with the gear-casing 16 by planetary gears 30 31, which latter are conveniently mounted in duplicate pairs in said casing 16, the members of each pair being engaged with each other and respectively engaged with said gears 26 and 28, as best shown in Fig. III. The described arrangement of the gears within said casing 16 is such that when both of the vehicle-wheels 4 encounter the same resistance, as when the vehicle is traversing a straight path, both of said wheels 4 are contemporaneously rotated by the gear-casing 16 without planetary progression of the gears 30 and 31. When, however, either of said vehicle-wheels 4 is retarded by the vehicle to one side or the other, the corresponding gear 26 or 28 is of course retarded and the continued rotation of said casing 16 causes planetary progression of the gears 30 31 with respect to the retarded gear, whereby the gear (26 or 28) corresponding to the unretarded wheel 4 is rotated with the latter independently of the retarded wheel, and thus progresses the vehicle in a curved path.

It is to be understood that my improvements may be associated with other devices which are conveniently employed in self-propelled vehicles. For instance, the gear 9 is provided with a recessed flange 33, conveniently adapted to receive a brake-band. Moreover, although for convenient reference I have designated the element 9 as the "driving" element, and the element 16 as the "driven" element, it is to be understood that the links and levers connecting said elements serve to transmit rotary motion from one to the other with equal facility in either direction.

I do not desire to limit myself to the precise construction and arrangement which I have shown, as it is obvious that various modifications may be made therein without departing from the essential features of my invention.

I claim—

1. In gearing of the class described, the combination with a driving element; of a driven element; a link intermediate of said elements; a lever pivotally connected to said link; and, pivotal joints respectively connecting said link and said lever with said elements, whereby; continuous rotary motion may be transmitted from one to the other of said elements, irrespective of the relative gyration of their axes, substantially as set forth.

2. In gearing of the class described, the combination with a driving element; of a driven element; a pair of levers fulcrumed upon one of said elements and interengaged; and, links respectively connecting said levers with the other of said elements, whereby; continuous rotary motion may be transmitted from one to the other of said elements, irrespective of the relative gyration of their axes, substantially as set forth.

3. In gearing of the class described, the combination with a driving element provided with a central opening; of an axle extending through said opening and arranged to gyrate therein; a driven element mounted upon said axle in concentric relation therewith; a link intermediate of said driving and driven elements; a pivotal connection between said link and one of said elements; and, a lever pivotally connecting the other extremity of said link with the other of said elements; whereby, rotary motion may be transmitted from one to the other of said elements, irrespective of the relative gyration of their axes, substantially as set forth.

4. In gearing of the class described, the combination with a driving-gear provided with a central opening; of a vehicle-supporting-wheel axle extending through said opening and arranged to gyrate therein; a gear-casing mounted to rotate independently of said axle in concentric relation therewith; a link and lever connected to each other and respectively connected to said driving and driven elements; two vehicle-supporting wheels mounted on said axle; two gears respectively connected with said vehicle-supporting wheels in concentric relation with said gear-casing; two planetary gears mounted in said gear-casing in engagement with each other and respectively in engagement with said gears connected to said vehicle-supporting wheels; whereby, said vehicle-supporting wheels, may be rotated contemporaneously and independently, substantially as set forth.

5. In gearing of the class described, the combination with a driving-gear provided with a central opening; of a vehicle-supporting-wheel axle extending through said opening and arranged to gyrate therein; a gear-casing mounted to rotate independently of said axle in concentric relation therewith; a pair of interengaged levers fulcrumed upon said driving-gear; a pair of links respectively pivoted to said levers and pivoted to said gear-casing; and means operatively connecting said gear-casing and said axle; whereby, rotary motion may be transmitted from said driving-gear to said gear-casing, irrespective of the relative gyration of their axes, substantially as set forth.

6. In gearing of the class described, the combination with a driving-gear provided with a central opening; of a vehicle-supporting-wheel axle extending through said opening and arranged to gyrate therein; a vehicle-supporting wheel fixed to said axle; a vehicle-supporting wheel loose on said axle; a gear-casing mounted to rotate independently of said axle in concentric relation therewith; a pair of connected levers fulcrumed upon said driving-gear; a pair of links respectively pivoted to said levers and pivoted to said gear-casing; whereby, continuous rotary motion may be transmitted from said driving-gear to said gear-casing, irrespective of the relative gyration of their axes; two gears respectively fixed to said axle and to said loose wheel; and, a pair of planetary gears mounted in said casing in engagement with each other and in respective engagement with said two gears connected to said vehicle-supporting wheels; whereby, said vehicle-wheels may be rotated contemporaneously and independently, substantially as set forth.

In testimony whereof I have hereunto signed my name, at Philadelphia, Pennsylvania, this 10th day of April, 1902.

LEWIS JONES, JR.

Witnesses:
ARTHUR E. PAIGE,
E. L. FULLERTON.